(12) United States Patent
Chang et al.

(10) Patent No.: US 8,630,269 B1
(45) Date of Patent: Jan. 14, 2014

(54) WIRELESS NETWORK HAVING JOINT POWER AND DATA RATE ADAPTATION

(75) Inventors: Li Fung Chang, Holmdel, NJ (US); Kapil K. Chawla, Scotch Plains, NJ (US); Justin Che-I Chuang, Holmdel, NJ (US); Xiaoxin Qiu, Bridgewater, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 381 days.

(21) Appl. No.: 13/072,688

(22) Filed: Mar. 26, 2011

Related U.S. Application Data

(63) Continuation of application No. 11/899,722, filed on Sep. 6, 2007, now Pat. No. 7,933,251, which is a continuation of application No. 11/203,386, filed on Aug. 12, 2005, now Pat. No. 7,280,514, which is a continuation of application No. 10/001,650, filed on Oct. 31, 2001, now Pat. No. 6,950,670.

(51) Int. Cl.
*H04B 7/216* (2006.01)

(52) U.S. Cl.
USPC .............................. 370/335; 370/311; 455/522

(58) Field of Classification Search
USPC ......... 370/335, 333, 311, 342, 441, 479, 252; 455/522
See application file for complete search history.

(56) References Cited

U.S. PATENT DOCUMENTS

| | | | |
|---|---|---|---|
| 5,999,561 A * | 12/1999 | Naden et al. .................. | 375/142 |
| 6,108,323 A * | 8/2000 | Gray .............................. | 370/335 |
| 6,405,052 B1 * | 6/2002 | Faber ............................. | 455/522 |
| 6,690,652 B1 * | 2/2004 | Sadri ............................. | 370/252 |
| 6,744,808 B1 * | 6/2004 | Walley et al. ................. | 375/146 |
| 6,907,248 B2 * | 6/2005 | Lee et al. ...................... | 455/450 |
| 7,035,231 B2 * | 4/2006 | Yu et al. ........................ | 370/318 |
| 2001/0014113 A1 * | 8/2001 | Imura ........................... | 375/141 |
| 2001/0024467 A1 * | 9/2001 | Eto ................................ | 375/150 |
| 2001/0033553 A1 * | 10/2001 | Bi et al. ........................ | 370/318 |
| 2002/0101908 A1 * | 8/2002 | Kim et al. ..................... | 375/147 |
| 2003/0169681 A1 * | 9/2003 | Li et al. ........................ | 370/203 |

\* cited by examiner

*Primary Examiner* — Brian D Nguyen

(57) ABSTRACT

A wireless network includes transmission power and data rate adaptation based upon quality experienced by the user.

19 Claims, 3 Drawing Sheets

WIRELESS NETWORK HAVING JOINT POWER AND DATA RATE ADAPTATION

CROSS REFERENCE TO RELATED APPLICATIONS

This application is a continuation of co-pending application Ser. No. 11/899,722, entitled "Wireless Network Having Joint Power and Data Rate Adaptation," filed Sep. 6, 2007, which issued on Apr. 26, 2011 as U.S. Pat. No. 7,933,251, which is a continuation of application Ser. No. 11/203,386, entitled "Wireless Network Having Joint Power and Data Rate Adaptation," filed Aug. 12, 2005, which issued on Oct. 9, 2007 as U.S. Pat. No. 7,280,514, which is a continuation of application Ser. No. 10/001,650, entitled "Wireless Network Having Joint Power and Data Rate Adaptation," filed Oct. 31, 2001, which issued on Sep. 27, 2005 as U.S. Pat. No. 6,950,670.

STATEMENT REGARDING FEDERALLY SPONSORED RESEARCH

Not Applicable.

FIELD OF THE INVENTION

The present invention relates generally to communication systems and, more particularly, to wireless networks.

BACKGROUND OF THE INVENTION

As is known in the art, wireless communication systems, such as Enhanced Data rate for GSM Evolution (EDGE), Wideband Code Division. Multiple Access (WCDMA), and High Data Rate (HDR) CDMA, have radio resources that can be assigned to users adaptively based upon their channel conditions in order to optimize the overall system performance. The overall system performance for wireless systems is typically measured by the spectrum efficiency, in kbps/MHz/site, subject to a given user performance requirement (e.g. 90% of average user throughput should be higher than 50 kbps).

In the EDGE system, a radio resource includes a transmission power and a transmission format (modulation/coding). Each transmission format corresponds to one transmission rate. The transmission format is changed dynamically according to the measured channel conditions for maximizing user throughput. Power control can also be used to enhance system performance.

In WCDMA, the radio resources are represented by a transmission power and a spreading code with different spreading factors (i.e. Orthogonal Variable Spreading Factor (OVSF)). Different transmission rates can be achieved by varying the transmission power and code allocation. HDR is similar to WCDMA as both transmission power and spreading code can be varied to maximize the system throughput. However, determining an optimal power and transmission rate allocation for all the system users is quite challenging. In addition, known systems require a central controller for acquiring knowledge of propagation conditions for all of the active users in the system. Such systems are unable to achieve the optimal allocation of scarce radio resources.

It would, therefore, be desirable to provide a wireless system that overcomes the aforesaid and other disadvantages.

SUMMARY OF THE INVENTION

The present invention provides a wireless network having decentralized transmission power and data rate adaptation hued upon user link quality. With this arrangement, power and data rates move to optimal levels based upon feedback from the mobile stations served by the network. While the invention is primarily shown and described in conjunction with mobile devices served by a wireless network, it is understood that the invention is applicable to networks in general in which power and data rate adaptation is desirable.

In one aspect of the invention, a wireless network includes a plurality of mobile stations served by respective base stations. Each mobile station remains at a current transmission rate until the mobile station meets predetermined performance criteria to increase or decrease the transmission rate for the next frame, for example. As the transmission rate is adjusted, the transmission power is modified to achieve the required level of performance for the transmission rate.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
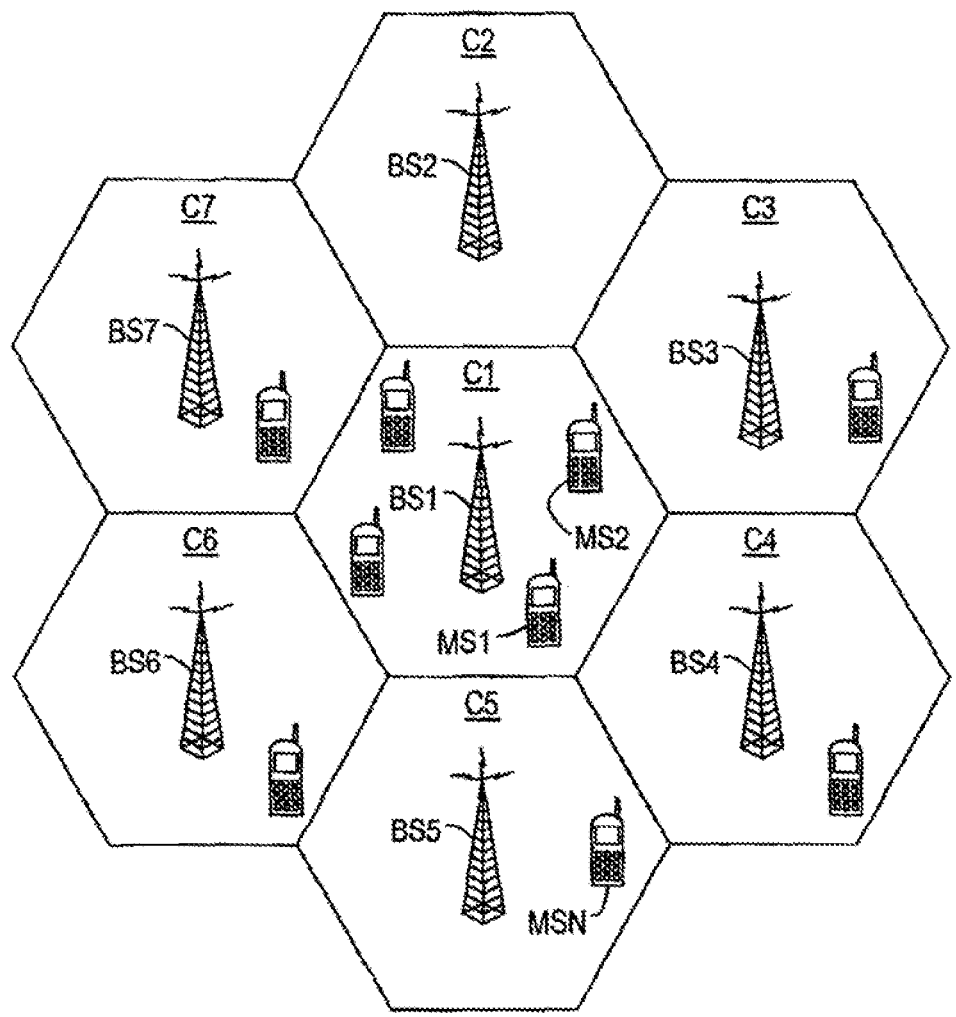
FIG. 1 is a schematic depiction of a wireless network having transmission power and data rate adaptation in accordance with the present invention.

FIG. 1 shows an exemplary wireless network 100 having dynamic power control and data rate adaptation in accordance with the present invention. The network 100 includes a plurality of base stations BS1-7 each serving a respective sector or cell C1-7. Mobile stations MS1-N can be located in the various cells C1-7 and transmit and receive data from the serving base station BS.

While the invention is primarily described in conjunction with a Wideband Code Division Multiple Access (WCDMA) system, it is understood that the invention is applicable to other wireless systems, such as EDGE and HDR, having a variety of modulation formats including Time Division Multiplexing (TDM), Code Division Multiplexing (CDM), Frequency Division Multiplexing (FDM), and combinations of these formats.

The invention provides a decentralized, heuristic power/rate adaptation technique that enhances overall system performance. In general, an active mobile station MS remains at a current transmission rate until the mobile station MS meets specified performance criteria. In an exemplary embodiment, a first criterion, such as a threshold link quality measure, is used to qualify the mobile station to step up to the next higher transmission rate. A second criterion is used to step down the data rate to the next lower transmission rate. In other words, the mobile station transmission rate follows a series of steps until arriving at the optimal transmission rate for that mobile station. In addition, at each step, power control is used to achieve the required level of performance for the corresponding transmission rate.

Figure 2:
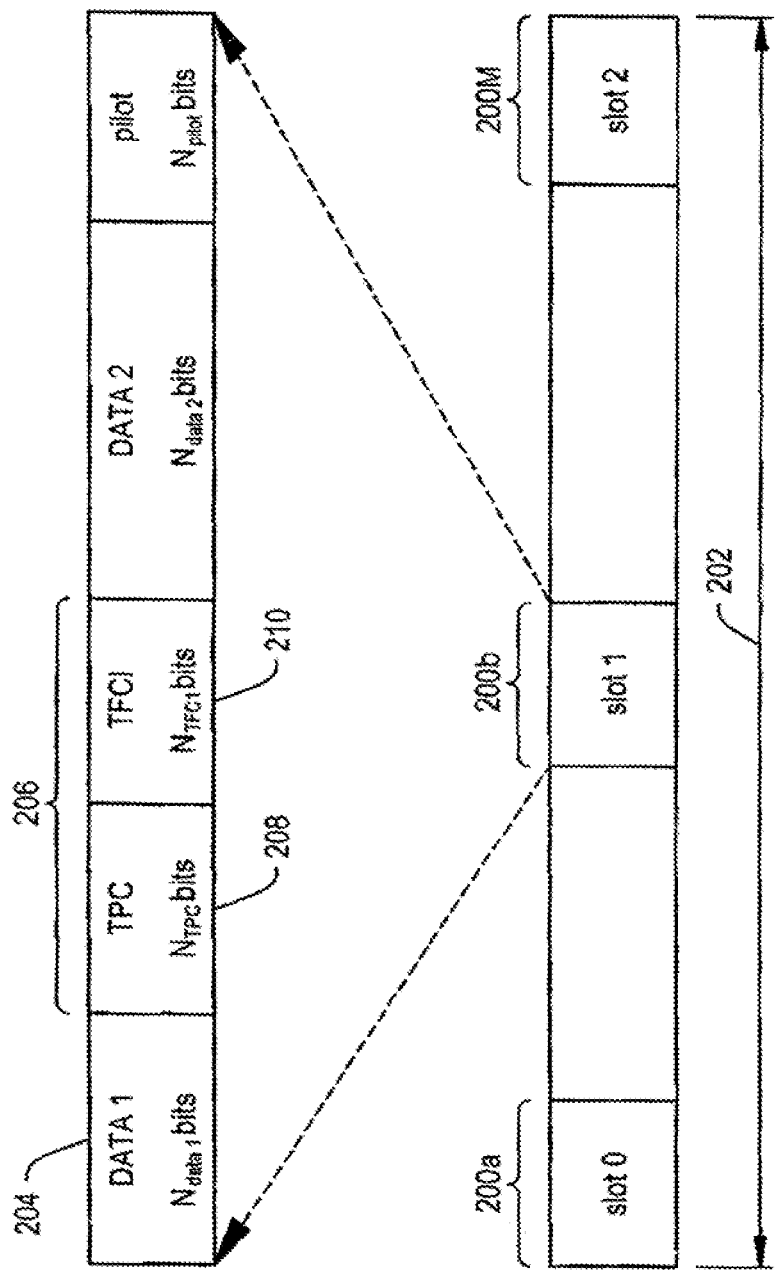
FIG. 2 is a schematic depiction of an exemplary frame that can be generated by the system of FIG. 1.

Referring now to FIG. 2, an exemplary time structure is shown for which joint power and rate adaptation in accordance with the present invention is implemented. Let k (not shown) denote the transmission rate index, which ranges from 1 to N and corresponds to an actual transmission rate of R(k) (e.g. R(k)=12×2$^{(k-1)}$ kbps). The joint power and rate adaptation algorithm works as follows for the exemplary WCDMA-type time structure shown. Time is divided into time slots 200a-M, which are grouped into a frame 202. The channel condition, e.g. Signal-to-Interference-plus-Noise Ratio (SLNR), can be measured and power control can be performed on a slot-by-slot basis.

In the exemplary embodiment shown, each slot 200 includes a downlink physical data channel (DPCCH) portion 204 containing a predetermined number of data bits and a downlink physical control channel (DPCCH) portion 206. The DPCCH portion 206 further includes a transmit power control (TPC) portion 208 and a transmit format combination indicator portion 210 that combine to adaptively adjust power and transmission rate, as described more fully below.

In one particular embodiment, the transmitted data is decoded after receiving the entire flame 202. It is understood that the illustrated time structure is intended to facilitate an understanding of the invention and the inventive algorithm is independent of this exemplary structure.

Figure 3:
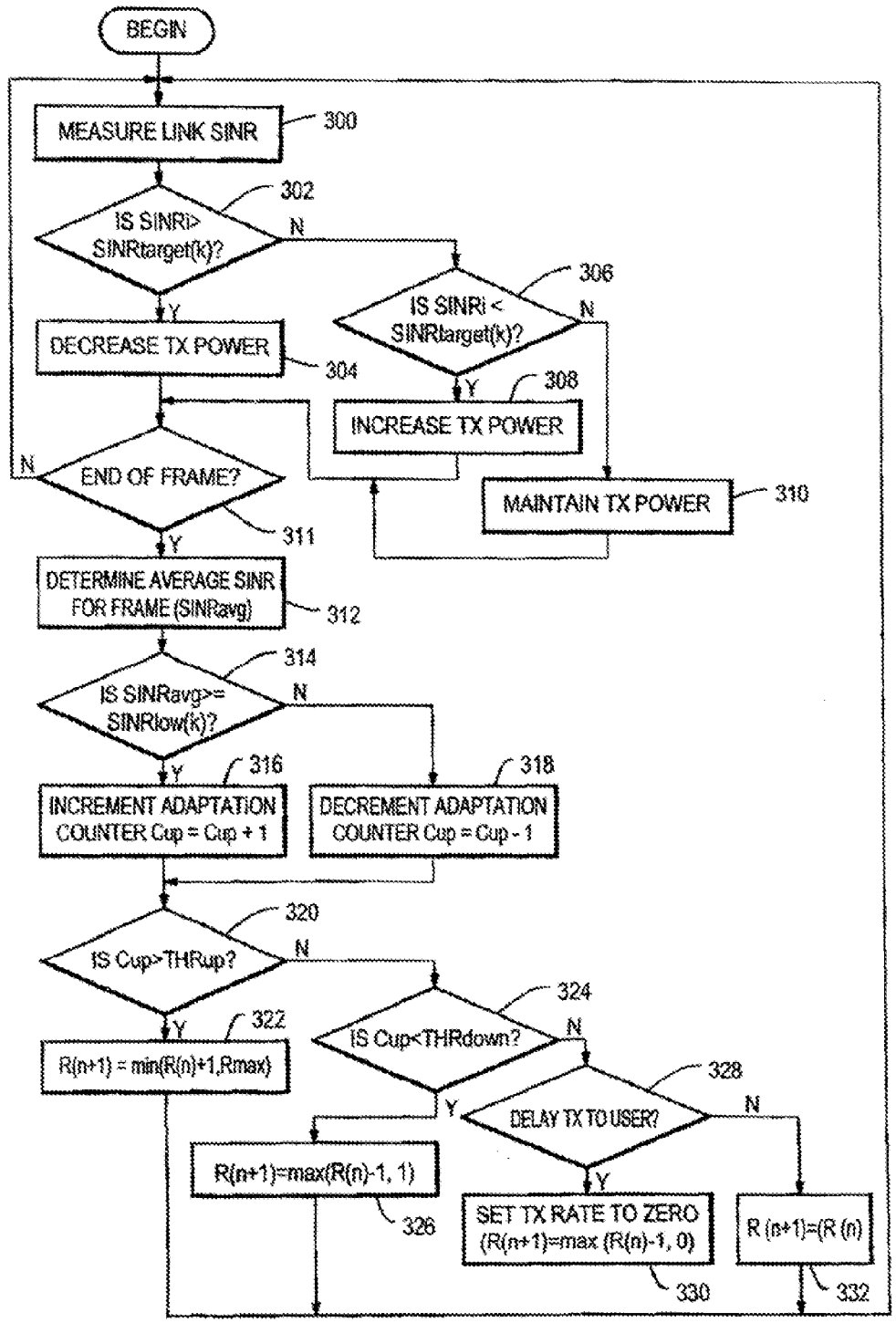
FIG. 3 is a flow diagram showing an exemplary sequence of steps for implementing transmission power and data rate adaptation in a wireless network in accordance with the present invention.

FIG. 3 shows an exemplary sequence of steps for implementing joint power and rate adaptation in accordance with the present invention. In one embodiment, an initial transmission rate R(0) is selected based upon SINR measurements so that R(0) does not exceed the maximum rate supported by the code and power currently available at the serving base station.

In step 300, the SINR is measured to determine link performance. In step 302, the measured SINR is used to adjust transmission power towards the power control target specified for the selected transmission rate (k). That is, it is determined whether the measured SINR level is greater than the target SINR level; i.e., whether $SINR_i > SINR_{target}(k)$, where $SINR_i$, is the measured SINR at the ith time slot and $SINR_{target}(k)$ is the target SINR for the selected transmission rate k. If so, in step 304, the transmission power is decreased by a predetermined amount Δ dB, e.g. 1 dB. If not, in step 306, it is determined whether the measured level is less then the target level, i.e., whether $SINR_i < SINR_{taret}(k)$. If it is, then in step 308 the transmission power is increased by a predetermined amount Δ dB, e.g. 1 dB. Otherwise, the current transmission power is maintained in step 310. It will be readily apparent to one of ordinary skill in the art that the transmission power up and down step adjustments can vary to meet the requirements of a particular application. In addition, it is understood that the up and down steps need not be the same amount.

At the end of each frame, for example, as determined in step 311, the mobile station determines the average received SINR in the previous frame ($SINR_{avg}$) in step 312. In step 314, it is determined whether the average SINR ($SINR_{avg}$) is greater than or equal to a predetermined threshold for the current or selected rate ($SINR_{low}(k)$), i.e., whether $SINR_{avg} >= SINR_{low}(k)$. If so, then a rate adaptation counter is incremented, i.e., $C_{up} = C_{up} + 1$, in step 316. Otherwise, in step 318 the rate adaptation counter is decremented, i.e., $C_{up} = C_{up} - 1$. While counters are used to step the transmission rate up and down in the illustrative embodiment, alternative mechanisms will be readily apparent to one of ordinary skill in the art.

In step 320, it is determined whether the rate adaptation counter has crossed a predetermined up threshold, i.e., whether $C_{up} > THR_{up}$. If it has, then in step 322 the transmission rate is updated. In an exemplary embodiment, the transmission rate for the next frame (R(n+1)) is updated to reflect the minimum of the rate of the current frame plus one (R(n)+1) and a predetermined maximum supported rate ($R_{max}$), i.e., R(n+1)=min(R(n)+1, $R_{max}$). If the rate adaptation counter was not greater than the up threshold, as determined in step 320, then in step 324 it is determined whether the counter value is less than a predetermined down threshold, i.e., whether $C_{up} < THR_{down}$. In one particular embodiment, the up threshold $THR_{up}$ is three, the down threshold $THR_{down}$ is minus three, and $R_{max}$ is the maximum transmission rate supported by the system.

If the rate adaptation counter was less than the predetermined down threshold, then in step 326 the transmission rate for the next frame (R(n+1)) is updated to reflect the maximum of the rate for the current frame minus one (R(n)−1) and one, i.e., R(n+1)=max(R(n)−1, 1). In one particular embodiment, a rate of one corresponds to a predetermined minimum transmission rate. In step 328 it is determined whether transmission to the mobile station should be delayed. If it is determined that the transmission should be delayed, then the transmission rate is dropped to zero in step 330 by setting the rate to the minimum of the current minus one and zero, i.e., (R(n+1)=min(R(n)−1, 0)). If not, in step 332 the transmission rate remains unchanged, i.e., R(n+1)=R(n). It is understood that the step of determining whether to drop the transmission rate to zero can be located in a variety of locations in the flow sequence as well as interrupt driven.

The above steps are repeated to continually update the transmission rate and control the power to optimize the link quality based upon the measured SINR. It is understood that a wide variety of link quality measures can be utilized without departing from the present invention provided the measure enables relatively rapid power and rate adjustments as in the present invention.

The present invention provides a wireless system with joint power and transmission rate adaptation. With this arrangement, the system is relatively robust against estimation or selection errors. In addition, the system provides enhanced radio resource management. Further, the limited radio spectrum can be utilized more efficiently so as to provide higher system capacity than known systems.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for jointly adapting power and data transmission rate in a wideband code division multiple access wireless network, comprising:

determining for a wireless base station of the network a spreading code adjustment based on an average link quality of at least one previous uplink frame;

determining for the wireless base station a transmit power adjustment based on a link quality of at least one time slot of a current uplink frame;

transmitting from the wireless base station a downlink frame having a time slot, the time slot of the downlink frame comprising a downlink physical data channel portion carrying payload data and a downlink physical control channel portion, the downlink physical control channel portion including:

a transmit power control portion containing information based on the transmit power adjustment; and a transmit format combination indicator portion containing information based on the spreading code adjustment; and wherein determining the transmit power adjustment based on the link quality of at least one time slot of a current uplink frame further comprises:
   stepping a rate adaption counter value based on a comparison of the average link quality with a predetermined link quality threshold; and
   comparing the rate adaption counter value with upper and lower rate adaption counter thresholds.

2. The method according to claim 1, wherein determining a spreading code adjustment based on an average link quality of at least one previous uplink frame further comprises:
   if the counter value is greater than the upper rate adaptation counter threshold, then determining spreading code adjustment that results in a transmission rate that is a minimum of a rate following a rate of the current uplink frame in a transmission rate index, and a maximum supported transmission rate.

3. The method according to claim 1 wherein the wireless base station has a wideband code division multiple access transmission capability and wherein transmitting a downlink frame comprises transmitting the downlink frame using wideband code division multiple access protocols.

4. The method according to claim 1, wherein the upper and lower rate adaptation counter thresholds are, respectively, positive and negative integers.

5. The method according to claim 1, wherein determining a spreading code adjustment based on an average link quality of at least one previous uplink frame further comprises:
   if the counter value is less than the lower rate adaptation counter threshold, then determining a spreading code adjustment that results in a transmission rate that is a minimum of a rate preceding a rate of the current uplink frame in a transmission rate index, and a first rate in the transmission rate index.

6. The method according to claim 1, wherein the downlink physical data channel portion precedes the downlink physical control channel portion in the time slot of the downlink frame.

7. The method according to claim 1, further comprising:
   determining whether a transmission should be delayed; and
   if the transmission should be delayed, determining a spreading code adjustment that results in a transmission rate of zero.

8. The method according to claim 1, wherein determining a transmit power adjustment based on a link quality of at least one time slot of the current uplink frame further comprises:
   assigning a predetermined down amount to the transmit power adjustment if the link quality is greater than a power control target range, and
   assigning a predetermined up amount to the transmit power adjustment if the link quality is lower than the power control target range.

9. The method according to claim 1, wherein the link quality and the average link quality correspond to measured signal-to-interference-plus-noise-ratio levels.

10. A tangible computer-readable medium having computer readable instructions stored thereon for execution by a processor to perform a method for jointly adapting power and data transmission rate in a wireless network, comprising:
   determining a spreading code adjustment based on an average link quality of at least one previous uplink frame;
   determining a transmit power adjustment based on a link quality of at least one time slot of a current uplink frame;
   transmitting a downlink frame having a time slot, the time slot of the downlink frame comprising a downlink physical data channel portion carrying payload data and a downlink physical control channel portion, the downlink physical control channel portion including:
      a transmit power control portion containing information based on the transmit power adjustment; and
      a transmit format combination indicator portion containing information based on the spreading code adjustment; and
   wherein determining the transmit power adjustment based on the link quality of at least one time slot of a current uplink frame further comprises:
      stepping a rate adaption counter value based on a comparison of the average link quality with a predetermined link quality threshold; and
      comparing the rate adaption counter value with upper and lower rate adaption counter thresholds.

11. The tangible computer-readable medium according to claim 10, wherein determining a spreading code adjustment based on an average link quality of at least one previous uplink frame further comprises:
   when the counter value is greater than the upper rate adaptation counter threshold, then determining spreading code adjustment that results in a transmission rate that is a minimum of a rate following a rate of the current uplink frame in a transmission rate index, and a maximum supported transmission rate.

12. The tangible computer-readable medium according to claim 10, wherein transmitting a downlink frame comprises transmitting the downlink frame using wideband code division multiple access protocols.

13. The tangible computer-readable medium according to claim 10, wherein the upper and lower rate adaptation counter thresholds are, respectively, positive and negative integers.

14. The tangible computer-readable medium according to claim 10, wherein determining a spreading code adjustment based on an average link quality of at least one previous uplink frame further comprises:
   when the counter value is less than the lower rate adaptation counter threshold, then determining a spreading code adjustment that results in a transmission rate that is a minimum of a rate preceding a rate of the current uplink frame in a transmission rate index, and a first rate in the transmission rate index.

15. The tangible computer-readable medium according to claim 10, wherein the downlink physical data channel portion precedes the downlink physical control channel portion in the time slot of the downlink frame.

16. The tangible computer-readable medium according to claim 10, wherein the method further comprises:
   determining whether a transmission should be delayed; and
   if the transmission should be delayed, determining a spreading code adjustment that results in a transmission rate of zero.

17. The tangible computer-readable medium according to claim 10, wherein determining a transmit power adjustment based on a link quality of at least one time slot of the current uplink frame further comprises:
   assigning a predetermined down amount to the transmit power adjustment if the link quality is greater than a power control target range, and
   assigning a predetermined up amount to the transmit power adjustment if the link quality is lower than the power control target range.

18. The tangible computer-readable medium according to claim 10, wherein the link quality and the average link quality correspond to measured signal-to-interference-plus-noise-ratio levels.

19. A method for jointly adapting power and data transmission rate in a wideband code division multiple access wireless network, comprising:
- determining for a wireless base station of the network a spreading code adjustment based on an average link quality of at least one previous uplink frame;
- determining for the wireless base station a transmit power adjustment based on a link quality of at least one time slot of a current uplink frame;
- transmitting from the wireless base station a downlink frame having a time slot, the time slot of the downlink frame comprising a downlink physical data channel portion carrying payload data and a downlink physical control channel portion, the downlink physical control channel portion including:
  - a transmit power control portion containing information based on the transmit power adjustment; and
  - a transmit format combination indicator portion containing information based on the spreading code adjustment;
- determining whether a transmission should be delayed; and
- if the transmission should be delayed, determining a spreading code adjustment that results in a transmission rate of zero.

\* \* \* \* \*